(12) United States Patent
Sugarev

(10) Patent No.: US 11,863,677 B2
(45) Date of Patent: Jan. 2, 2024

(54) SECURITY TOKEN VALIDATION

(71) Applicant: SAP SE, Walldorf (DE)

(72) Inventor: Radoslav Ivanov Sugarev, Petrich (BG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/158,064

(22) Filed: Jan. 23, 2023

(65) Prior Publication Data
US 2023/0163969 A1 May 25, 2023

Related U.S. Application Data

(63) Continuation of application No. 17/096,605, filed on Nov. 12, 2020, now Pat. No. 11,563,580.

(51) Int. Cl.
*H04L 29/06* (2006.01)
*H04L 9/32* (2006.01)
*H04L 9/30* (2006.01)

(52) U.S. Cl.
CPC .............. *H04L 9/3213* (2013.01); *H04L 9/30* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 8,019,860 B2 | 9/2011 | Ivanov et al. | |
| 9,256,413 B2 | 2/2016 | Ivanov et al. | |
| 9,900,212 B2 | 2/2018 | Pavlov et al. | |
| 2006/0021016 A1 | 1/2006 | Birk et al. | |
| 2015/0150109 A1 | 5/2015 | Bocanegra et al. | |
| 2016/0179494 A1 | 6/2016 | Pavlov et al. | |
| 2018/0075081 A1 | 3/2018 | Chipman | |
| 2019/0124070 A1* | 4/2019 | Engan | H04L 9/3234 |
| 2019/0372958 A1* | 12/2019 | Dunjic | H04L 9/3213 |
| 2020/0294338 A1 | 9/2020 | Musabeyoglu et al. | |
| 2020/0322151 A1* | 10/2020 | Latimer | H04L 63/108 |
| 2020/0412539 A1 | 12/2020 | Uy et al. | |

(Continued)

OTHER PUBLICATIONS

U.S. Appl. No. 17/158,509, Sugarev, filed Jan. 26, 2021.

(Continued)

*Primary Examiner* — Andrew J Steinle
(74) *Attorney, Agent, or Firm* — Fish & Richardson P.C.

(57) ABSTRACT

The present disclosure relates to computer-implemented methods, software, and systems for validating and revoking security tokens. A request for a resource is received at an application server and from a client. The request is associated with a security token for authenticating the client by the application server. A public key of an authentication server is acquired at the application server for authenticating requests at the application server. A signature of the security token is validated at the application server. By validating the signature of the security token, it is determined whether the security token is validly issued by the authentication server. In response to the received request, the application server determines at an identifier that is associated with the client and validates the security token based on the identifier to determine whether to serve the received request and provide the resource.

20 Claims, 4 Drawing Sheets

(56) References Cited

U.S. PATENT DOCUMENTS

2022/0150066 A1    5/2022    Sugarev

OTHER PUBLICATIONS

U.S. Appl. No. 17/158,533, Sugarev, filed Jan. 26, 2021.
Extended European Search Report issued in European Application No. 21199710.1 dated Feb. 28, 2022, 12 pages.
Hardt, "The OAuth 2.0 Authorization Framework", Oct. 2012, [retrieved on Jan. 27, 2021], retrieved from: URL <https://www.rfc-editor.org/info/rfc6749>, 76 pages.
Jones et al., "JSON Web Signature (JWS)", May 2015, [retrieved on Jan. 27, 2021], retrieved from: URL <https://www.rfc-editor.org/info/rfc7515>, 59 pages.
Jones et al., "JSON Web Token (JWT) Profile for OAuth 2.0 Client Authentication and Authorization Grants", May 2015, [retrieved on Jan. 27, 2021], retrieved from: URL <https://www.rfc-editor.org/info/rfc7523>, 12 pages.
Jones et al., "JSON Web Token (JWT)", May 2015, [retrieved on Jan. 27, 2021], retrieved from: URL <https://www.rfc-editor.org/info/rfc7519>, 30 pages.
Jwt.io [online], "Introduction to JSON Web Tokens" Oct. 2015, [retrieved on Jan. 27, 2021], retrieved from: URL <https://jwt.io/introduction/>, 11 pages.

* cited by examiner

SECURITY TOKEN VALIDATION

CLAIM OF PRIORITY

This application claims priority under 35 USC § 120 to U.S. patent application Ser. No. 17/096,605, filed on Nov. 12, 2020, entitled "SECURITY TOKEN VALIDATION", the entire contents of which are hereby incorporated by reference.

TECHNICAL FIELD

The present disclosure relates to computer-implemented methods, software, and systems for secure data processing.

BACKGROUND

Software applications can provide services and access to resources. Resources may be restricted to a limited number of users based on user rights and roles. Tokens can be used to authenticate requests received at software applications to gain access to electronically restricted resources. Tokens can be used in addition or as an alternative to passwords and can be verified to determine whether to provide or otherwise allow access. When a user requests access to a resource, a security token may be provided by the user to be authenticated prior to accessing the resource. The security token can be validated to determine whether the request can be processed and whether the requests is valid.

SUMMARY

The present disclosure involves systems, software, and computer implemented methods for validating security tokens.

One example method may include operations such as receiving, at an application server and from a client, a request for a resource, wherein the request is associated with a security token for authenticating the client by the application server; acquiring, at the application server, a public key of an authentication server associated with authenticating requests at the application server; validating, at the application server, a signature of the security token associated with the request for the resource, wherein validating the signature of the security token is based on the acquired public key of the authentication server, wherein validating the signature of the security token determines whether the security token is validly issued by the authentication server; in response to the received request, determining, at the application server, an identifier associated with the client; and validating, at the application server, the security token based on the identifier associated with the client to determine whether to serve the received request and provide the resource. Other implementations of this aspect include corresponding systems, apparatus, and computer programs, configured to perform the actions of the methods, encoded on computer storage devices.

Implementations can optionally include: in response to determining that the security token is valid, providing the requested resource to the client by the application.

In some instances, the determined identifier is a client key generated by the client and provided by the client to the authentication server for generating the security token.

In some instances, the determined identifier is a version value provided at a versioning field part of the received security token, and wherein the application server compares the determined version value with the stored values to determine whether the token is valid.

In some instances, determining the identifier associated with the client comprises retrieving the identifier from a security storage component based on information about a location of the identifier included in the security token, wherein the identifier comprises a client key incorporated in the security token during generation at the authentication server.

In some instances, the identifier is a client key generated in advance by the client and stored at a security storage component, wherein the client key is retrieved by the application server from the security storage component to validate the security token, wherein the security storage component is either external to the authentication server or within the authentication server.

In some instances, the identifier is received as part of client authentication data received with the request for the resource.

In some instances, the security token is generated at the authentication server in response to a request sent by the client to the authentication server, wherein during the generation the received request is validated at the authentication server, the client key is collected from a security storage component, a message authentication code of a payload portion of the security token is computed based on the client key, wherein the generated security token is signed with a public key of the authentication server, and wherein the security token includes the computed message authentication code as part of a header part of the security token.

In some instances, implementations can optionally include: generating, at the client, a client key as an identifier for the client; storing, at a security storage component, the generated client key; and generating the security token, at the authentication server, wherein the security token is generated to include a message authentication code that is computed using the client key.

In some instances, the received request for the resource at the application comprises a security token, wherein the security token is issued by the authentication server for the client, and wherein the request includes credentials of the client for the application server.

In some instances, the request includes information associated with a location of the client key to be retrieved by the application server.

In some instances, in response to a request to revoke security tokens associated with the client and the identifier, the identifier of the client is regenerated to a new identifier. Regenerating the identifier may include deleting the identifier, wherein regenerating the identifier invalidates one or more security tokens issued based on the identifier. When a request for a resource is received at the application server, the request may be determined to include a security token that is determined to be invalid as the security token includes an identifier that is invalidated. When the security token is determined as invalid in response to evaluating a received request, the request to provide the resource from the application server to the client can be rejected.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description, the drawings, and the claims.

DETAILED DESCRIPTION

Figure 1:
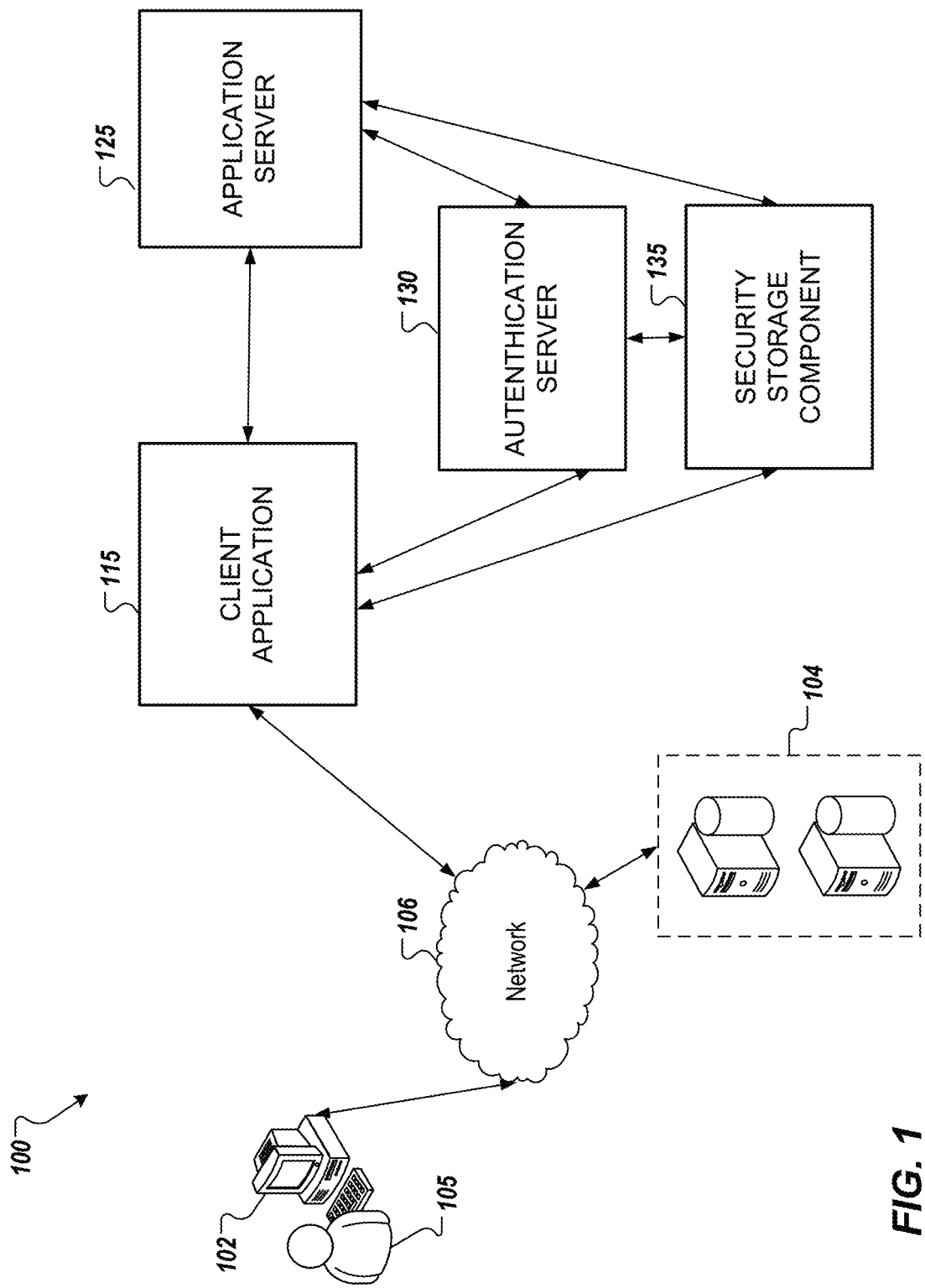
FIG. 1 illustrates an example computer system architecture for validating security tokens that can be used to execute implementations of the present disclosure.

The present disclosure describes various tools and techniques for providing resources from an application in a secure manner based on validation of security tokens.

In some instances, client applications can communicate with application servers and request for data and resources. The communication between the applications can be a secure communication where the client application authenticates at the application server, for example, through provided identity data of the requestor, for example, a user or a client application, among others.

When a user requests resources from an application server through a client application, the application server may verify the identity of the user requesting the resources and the client application sending the request, which may be performed by verifying a security token that is provided with the request or in a separate authentication interaction. The security token can be used to exchange information about the identity of the user between the client and the application server. In some instances, the security token can include information that facilitates sharing of identity and security information in an environment associated with multiple entities and domains. The security token may be issued by an identity provider, and can be verified by the application server based on a verification algorithm. For example, a client application can be provided with a security token issued by a security authentication server for authentication at the server application.

In some instances, a security token can be generated in a given format to encode security information for the identity of a user and/or an application. For example, a security token can be a software token that can be exchanged between communicating parties and can be validated based on public key validation of an authorized security service. The security token can be provided together with a request sent from a client to a server to authenticate the request and the user. For example, the security token can be an access token for accessing an application, such as a JSON Web Token (JWT).

A user can request issuance of the security token by a security provider, and when communication is initiated by the user through a client application and to an application server, the security token can be validated by the application server to determine whether the client application can obtain access to the requested resources. The security provider can support validation of security tokens and issuance of new security tokens to enable a client to obtain access to resources from the application server.

In some instances, a security token that has been issued for a user to obtain access to an application server may be required to be revoked. For example, revocation can happen if a security breach has occurred where the security token has been potentially stolen by an unauthorized party. In such cases, the user may want to renew or regenerate a new security token to replace the previous token, while also cancelling the previous token so that requests including the stolen token are rejected. Further, a security token may become obsolete when it is no longer associated with an authorized party, for example, when as access rights for the user are cancelled.

In some instances, when a request for a resource is received that includes or is associated with a security token for authenticating the request, the request may be granted only if the security token is valid at the time of the authentication. A security token can be evaluated and determined as valid if the security token can be verified as originating from a security service provider and if the security token is not associated with an instruction for revocation. Such instructions for revocation may include, for example, where the security token is reported as leaked in cases of identity theft, security breaches, and others instances, such as after expiration of the security token.

In some instances, when a security token is requested for generation at an authentication server that provides security services, the security token can be encoded with a client identifier associated with the client application that can be used when requesting services from the application server. For example, the client identifier can be a client secret key that can be used to compute the message authentication code or other unique identification key. In some instances, the client identifier can be associated with various parties, depending on the implementation and a configured granularity for the token generation and/or requirements for revocation of tokens. For example, the client identifier can be generated and used on a client application level, on a user level, or, for example, based on a subscription level. In the example of subscription level, a subscription account can be defined to group users that access the application server through the client application. In some instances, based on the definition (and granularity of the definition) and usage of the client identifier, token generation can be controlled to define a number of tokens that can be managed in a common way, for example, that can be revoked as a group in cases of potential breach. For example, if a token is associated with only one user, then if a potential breach is reported, the token of the user may be requested for revocation. In some other examples, if a client identifier is associated with multiple users, e.g., a subscription account, or other type of grouping of users, there may be configurations defined for requesting revocation. For example, a pre-configured policy can be defined to initiate revocation of a token (and corresponding client identifier), even if only one user of the group and/or account has reported a potential security breach. In the context of the example with a client identifier associated with multiple tokens, the control of the tokens can be managed as a whole, rather than on single user basis, which may improve security for a given subscription or account. In some instances, if it is desired to control tokens issued for a particular client application without considering defined subscriptions and/or groups, then a client application level-identifier may be set up. When using identifiers on a client application level, the granularity of the token generation corresponds to the client application, and in the case where the client application itself has a reported security breach, the tokens associated with this client application may be revoked as a whole since it may not be evident which tokens for which customers were stolen.

In some instances, a client identifier can be encoded in one or more tokens to correspond to different granularity levels of binding tokens with identifiers. Thus, different security considerations can be addressed based on different granularities configured for the token generation. In some other instances, a configuration of encoding of identifiers into tokens to provide managing of tokens on multiple levels can be performed if the tokens are generated based on different identifiers. For example, identifiers can be encoded on different levels correspond to client, group, subscription, among others. These identifiers can be linked to form a known sequence. For example, the used identifiers can be simple and unique system-wide identifiers or secret keys of entities (e.g., user, company, client application, etc.) that can be used to compute a message authentication code of a token by using the keys of all parties in a known sequence. Thus, a first key of a user can be used first, then the key of the company, and then the key of the client application. By using a known sequence (or order) for the generation of the message authentication code of a token, the payload of the token may include information about all of the parties. For example, the payload can include the user identifier, the company tenant identifier, and the client application identifier of the client application for which the token is generated. In cases where tokens are generated based on multiple identifiers, if any one of the identifiers is changed or not maintained for reference, those tokens that are associated with any changed identifier would be invalidated and rights associated with the tokens would be revoked. In these cases, revocation of tokens can be performed more flexibly, as a security breach at any level in the sequence of identifiers can be addressed by changes at the particular level. Additionally, control over access to resources can be executed faster and more efficiently when performing token revocation.

If the security token is generated to include a client identifier that uniquely identifies the client application, such as a client key or other unique identifier, the security token can be validated based on an analysis of the client identifiable information encoded in the security token. In some instances, the security token can be a self-contained token, and thus the interactions between the application server and the authentication server can be limited. For example, the interactions may be scheduled and related to refreshing an authentication server public key or certificate on pre-defined time periods (e.g., every 24 hours) or on-demand. In such instances, the application server is more robust to eventual failures of the authentication server. In such instances, a two-level validation of the security token is provided. The two-level validation includes validating whether the security token has been validly issued by a security service provider, and whether the security token is associated with a valid client request. The validation as to whether the security token is associated with a valid client request may be performed to determine whether the security token is associated with a request for token revocation, for example, based on a request for revocation from a user of the client application. The validation as to whether the security token is associated with a valid client request may be based on a determination of whether the security token includes a client identifier that is a valid identifier for the client application. For example, the client identifier information may be a client key or a verification number that can be stored at a security storage location that maintains identifier information associated with users that can be confirmed as authorized for accessing an application server through an application.

FIG. 1 depicts an example architecture 100 in accordance with implementations of the present disclosure. In the depicted example, the example architecture 100 includes a client device 102, a network 106, and a server system 104. The server system 104 includes one or more server devices and databases. In the depicted example, a user 105 interacts with the client device 102.

In some examples, the client device 102 can communicate with the server system 104 over the network 106. The client device 102 may include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems receives and evaluates requests for application services, and, where appropriate, provides such services to any number of client devices (e.g., the client device 102 over the network 106).

In accordance with implementations of the present disclosure, and as noted above, the network 106 can be associated with a client application that is communicatively coupled to a server application.

In some instances, the user 105 may access a client application 115 through the network 106. The client application 115 may be communicatively coupled with an application server 125. The application server 125 may include application logic implemented to provide services and resources to end users. To respond to requests received from the client application 115, the application server 125 performs identity verification for the received requests and validates the request to determine whether the requests is associated with an authorized use. In some instances, the client application 115 sends a security token to the application server 125 to authenticate the request. The security token can be generated for the client application 115 by an authentication server 130, which may be separate and unrelated, in some cases, to the application server 125. Prior to sending a request to the application server 125, the client application 115 generates the security token at the authentication server 130 and provides an identifier for the generation of the security token. The provided identifier is an identifier to associate the security token with the client application, and is to be used for generating the content of the security token so that when the security token is validated by the application server 125, the application server 125 may gain access to the identifier, where the identifier is validated to determine whether the security key is still valid for authorizing requests originating from the client application.

In some instances, the identifier may be a client key or another unique identifier that can be generated by the client application 115 and may be stored at a security storage component 135. In some instances, the client application 115 may generate the identifier and store it at the security storage component 135. When the client application 115 generates a security token at the authentication server 130, the client can provide the client key or a reference to a location where the security storage component 135 is persisted. In some instances, the security storage component 135 may be part of the authentication server 130, part of the client application 115, or part of another component. In other instances, the security storage component 135 may not be a part of an external entity or system.

In some instances, when the application server 125 receives a request from the client application 115, a security token included in or associated with the request can be identified, and the security token can be validated. In particular, the security token can be validated to determine whether the token is validly issued by a security identity authority, as well as whether the token is currently validly associated with a client application. Validation can be performed by the application server 125 using a public key or a certificate of the authentication server 130. In some instances, validation can also be performed by performing interactions between the application server 125 and the authentication server 130 to determine whether the security token is validly issued, and/or by the application server 125 and the security storage component 135 to determine whether the security token is currently maintained as valid for the client application. In situations where the security token is stolen, a validation that is performed only with the authentication server 130 cannot recognize that even if the token has been validly issued, the token should still not be validated. For example, a security token can be considered invalid, even if validly issued, if the token is associated with a prior revocation notice from the client application. By performing two-level validation of security tokens, security and performance can be improved, and protection can be provided in response responding to requests associated with invalidated security tokens.

In some instances, when a security token is issued by an authentication server based on signing with a private key of the authentication server and when such token is validated only based on the public key of the authentication server, such a token is non-revocable on client application level. In such instances, if the authentication server determines that a particular security token that has been issued is requested to be revoked, the authentication server may regenerate all security tokens that are issued using different server keys or certificates, and invalidate a previously used key or certificate. However, such a regeneration may affect more than one client application, as an invalidation of a single token may affect multiple security tokens. In some instances, if a token generated by an authentication server is requested to be invalidated, then the authentication server can regenerate the key pair including public and private keys that are used for signing and validating an issued token. For a single token to be invalidated, the rights associated with the token can be invalidated by changing the key pair including a private key that is used for issuing tokens, and a public key that is used for validating already issued tokens. Thus, if the key pair is regenerated to support invalidation of one token, other tokens issued by the authentication server can be determined as invalid when used to authenticate with the server application, even though they have not been requested to be invalidated. Therefore, by validating a security token based on considerations associated with the authentication server (validated with the server public key) and the client application (e.g., using the identifier to perform the validation), security token management can be performed with improved precision, in a faster and more efficient manner, and with improved security.

In some instances, the client application can store a previously fetched or configured public key of the authentication server (e.g., without refreshing it) for a long period of time. If a public key is changed at the authentication server level, and the client application has not refreshed the information for the public key of the authentication server, a request based on a token that should not be valid may be determined as valid (e.g., by providing a false positive validation result). By encoding an identifier in the token used for validating a request, the validation process is configured to include verification based on the identifier, where such an identifier is not persisted at the client application and/or the application server.

In some instances, generation of security tokens based on client identifiers can move the responsibility for handling revocation requests of an issued security token from the authentication server to the client application, as the identifiers that are used for the generation of the security tokens can be maintained by the client application. Thus, the client application can more efficiently take actions to revoke an issued token in response to a received revocation request from a user, as the client application has to revoke its identifier, for example, by regenerating it, rather than through additional communication with an external entity. If a revocation is performed on an authentication server level, such revocation may have an effect on other security tokens that are not associated with the security token specifically included in the request for revocation.

Figure 2:
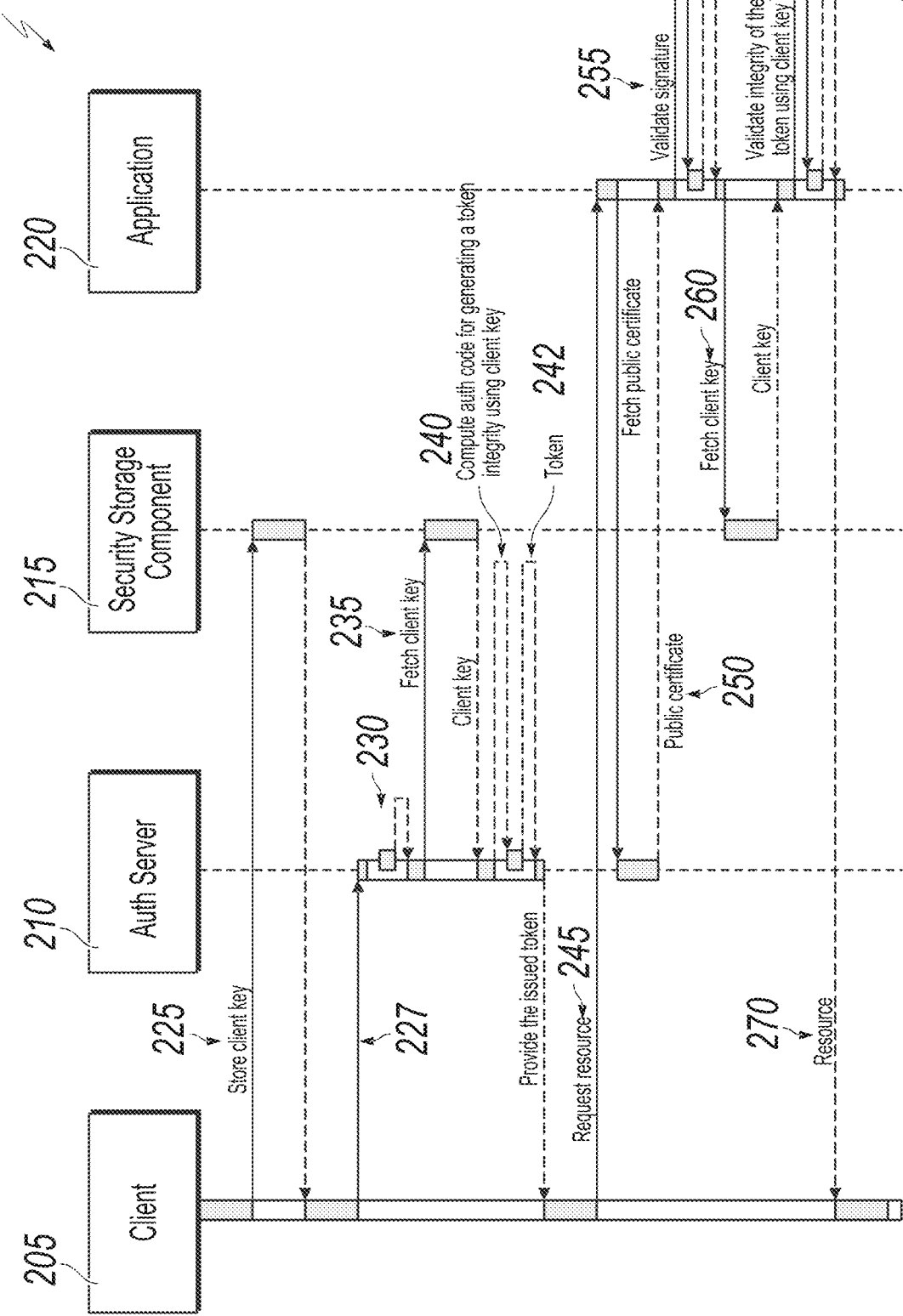
FIG. 2 is a block diagram for an example system in accordance with implementations of the present disclosure.

FIG. 2 is a block diagram for an example system 200 in accordance with implementations of the present disclosure. The example system 200 includes a client 205, an authentication server 210, a security storage component 215, and an application 220. The client 205, the authentication server 210, the security storage component 215, and the application 220 may be such as, for example, the client application 115, the authentication server 130, the security storage component 135, and the application server 125 of FIG. 1.

In some instances, the client 205 and the application 220 are communicatively coupled in relation to implemented services at the application 220, where the client 205 invokes resources from the application 220. When the client 205 sends requests to the application 220, these requests are associated with users of the client 205 and may include identity credentials associated with client 205, where the identity credentials can be used by the application 220 to determine whether the request is valid and authorized to be served.

In some instances, and as discussed in relation to FIG. 1, the client 205 generates a client key as an identifier that may be incorporated into security tokens generated for the client 205 by the authentication server 210. The client 205 stores (at 225) the client key at the security storage component 215. In some examples, the security storage component 215 is a VAULT storage, database, table, or other component for securely storing keys and credentials.

At 227, a token generation request is sent from client 205 to the authentication server 210. In some examples, the token that is requested may be generated in a JSON Web Token format. In some instances, the token generation request includes client credentials and, optionally, an authorization code for the client 205, where the authorization code provides authorization proof for token generation from the authentication server 210. In some instances, the authentication code can be issued through a previous interaction between the client 205 and the authentication server 210.

In some instances, in the case where the application 220 has to verify the message authentication code, information about the client secret key location can be identified as a header portion of the token. For example the header portion of the token may have an example syntax as presented in Table 1 below.

TABLE 1

{ ... omitted attributes ...
"mac" : "<message-authentication-code-value>",
"msu" : "<secret-key-location>",
"macAlg" : "used algorithm>",
... omitted attributes ... }

In the example of Table 1, the "msu" property can be an abbreviation of message authentication code secret key location URL and can point to a valid URL where the client secret key could be downloaded. The message authentication code can be part of the header of the token, such as a JSON Web Token header.

In Table 1, the "mac" property can be an abbreviation of message authentication code property and can include a valid message authentication code as a value. The "macAlg" is an abbreviation of message authentication code algorithm and can include a valid algorithm as value.

At the authentication server 210, the message authentication code can be computed based on a payload portion of the token by using the configured or specified in the authentication server assertion claims algorithm. At the application 210, the message authentication code can be computed again based on the token payload using the specified algorithm in the token header. After successful computation of the message authentication code, the value of the code can be compared for equality with the code in the header of the token. If they are equal, then the request can be allowed, otherwise it can be rejected.

In some instances, the authentication server 210 may implement an industry-standard protocol for authorization, such as the OAUTH 2.0.

In some instances, the generated security token can be a JSON Web Token that provides a compact and self-contained way for securely transmitting information between parties as a JSON object. The security token may be signed and/or encrypted. The structure of a security token, such as the JSON Web Tokens with a signature, includes three parts—a header, payload, and a signature. For example, a JSON Web Token usually has the following format: Header.Payload.Signature. The header may include information for the type of the token and the signing algorithm being used. The payload of the security token includes claims that include statements about an entity (for example, the user) and additional data. To create the signature part of the token, a system can combine data including the encoded header, the encoded payload, and a secret or public key, and an identification of the algorithm to be specified in the header, and sign that combination of data.

For example, even though that security tokens can be self-contained and guaranteed based on their integrity, a stolen token cannot be revoked without affecting other tokens issued by the same authentication server if the token are issued and authenticated only based on a public and private key pair of the authentication server. If a security token is requested to be revoked from an authentication server, the authentication server may revoke its security keys or credentials that are also related to other security tokens issued by the same authentication server.

At 230, the request is validated. The client 205 can be validated based on the provided request and included credentials.

At 235, the authentication server 210 retrieves a client key from the security storage component 215. The client key that is retrieved is identified based on the received request. In some instances, the received request may provide information for locating the client key. In other instances, the authentication server 210 may be provided with identification of a location for retrieving the client key through a separate transaction or with an additional configuration setup prior the generation of the requested token. For example, the sharing of information for locating the client key may be performed during a previous interaction between the authentication server 210 and the client 205. In other instances, the authentication server 210 may incorporate the security storage component 215 and may invoke information for the client key internally.

At 240, a message authentication code of a payload of the security token can be computed. The computation may be performed using an algorithm for authentication code generation of a given type. In some instances, the algorithm type may be provided to the authentication server 210 in the same manner as the information for the location of the client key is provided.

At 242, the security token is issued by signing the header and the payload portion of the token with the private key of the authentication server 210. The security token as generated includes the message authentication code as computed using the client key that was retrieved at 235 from the security storage component 215. In some instances, the computed message authentication code can be part of the header of the security token.

In some instances, the algorithm used to compute the message authentication code can be included in the header of the security token.

The issued token can be provided to the client 205.

At 245, which may occur at any time after the prior operations, the client 205 can request a resource from the application 220 using the issued security token generated (at 242) by the authentication server 210. In response to receiving the request, the application 220 fetches a public key or a certificate of the authentication server 210. In some instances, after the public key or certificate is fetched, the key or certificate is stored at the application 220.

At 255, a signature of the security token provided with the request for resources at 245 is validated. The validation can be performed based on the fetched public key or certificate of the authentication server 210. The validation is performed by the application 220 to determine whether the security token that was used in association with the request 245 is a token validly issued by the authentication server 210, where the authentication server 210 is a trusted authority to issue security tokens.

At 260, the application 220 fetches a client key from the security storage component 230. The application 220 requests the client key from the security storage component 215 based on credentials of the client 205 that were received with the request. The information about the client key location and how to retrieve the client key may, in some instances, be part of or included in the header of the security token.

At 265, the message authentication code of the payload of the security token is validated based on the retrieved client key to determine whether the security token is still valid and not only validly issued by an authorized authority.

At 270, in response to the security token being validated at 255 and 265, a response including the requested resource is provided to the client 205.

Figure 3:
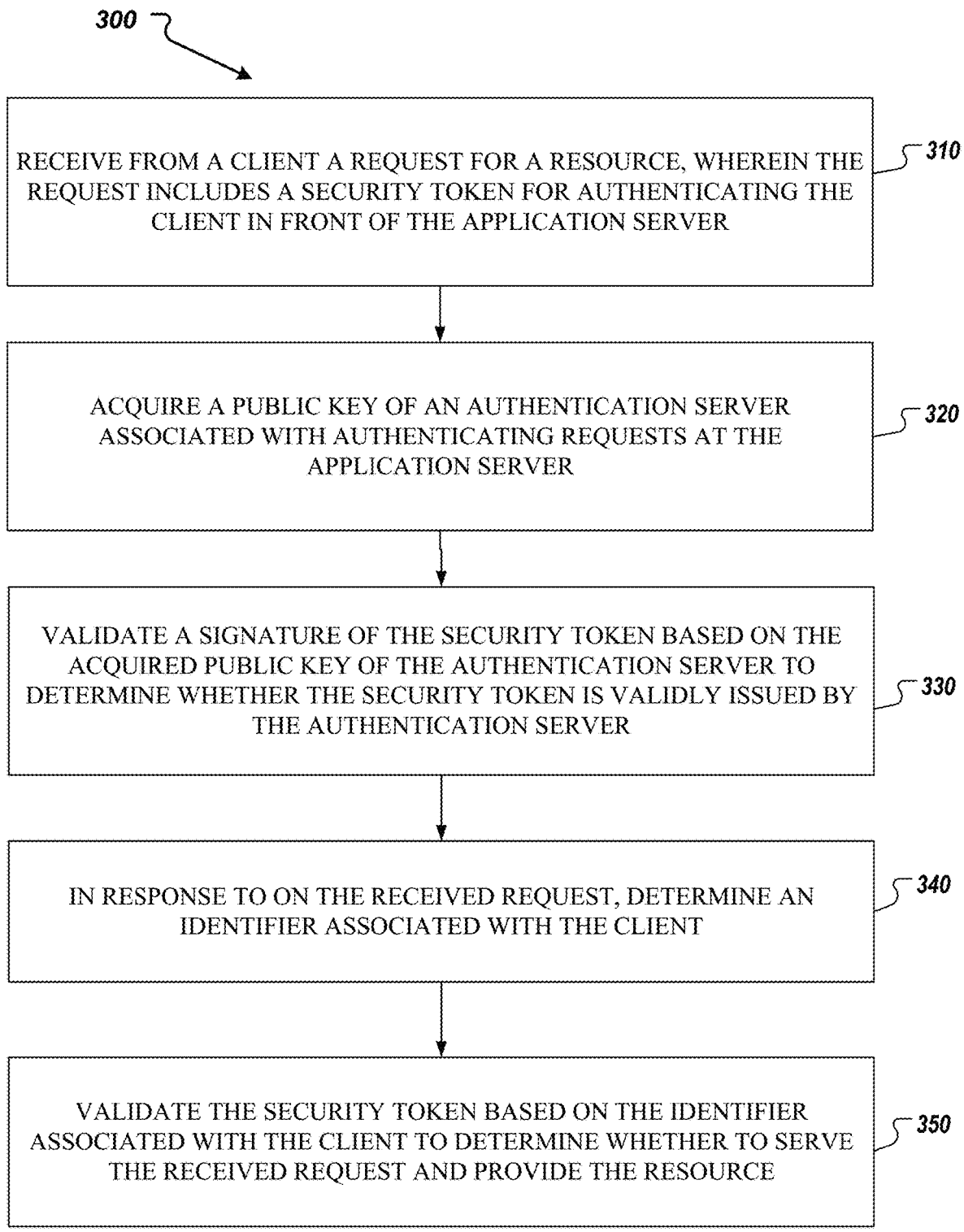
FIG. 3 is a flowchart for an example method for authenticating requests for resources based on validating security tokens in accordance with implementations of the present disclosure.

FIG. 3 is a flowchart for an example method 300 for authenticating requests for resources based on validating security tokens in accordance with implementations of the present disclosure. The example method 300 may be performed at a system environment, such as the example system 200 of FIG. 2. For example, the method 300 may be performed at the application server 125 of FIG. 1 or application 220 of FIG. 2, in communication with a client application, such as client application 115 of FIG. 1 or client 205 of FIG. 2.

At 310, a request for a resource is received at an application server, where the request is received from a client. The client may be communicatively coupled to the application server and may send requests to the server based on received user interactions. The request sent by the client to the application server may include a security token, which can be used to authenticate the client at the application server. The security token may include client identification information that can be verified to determine whether the security token is associated with a client application that is authorized to receive resources from the application. To determine whether the received request is a valid request, the application server can validate the security token to determine the identity of the requester and whether the security token is associated with a user authorized for the request. The security token may be issued by an authentication server, such as the authentication server 130 of FIG. 1.

In some instances, and prior to receiving the request, the client application can request generation of a security token from the authentication server. The authentication server can generate the security token by validating the received request at the authentication server, collecting or identifying a client key from the security storage component, computing a message authentication code of a payload portion of the security token based on the client key, and generating the security token. The generated security token can be signed with a public key of the authentication server, and, some instances, can include the computed message authentication code as part of a header part of the security token.

Returning to the operations of FIG. 3, a public key of an authentication server associated with authenticating requests at the application server is acquired at the application server at 320. The authentication server can be a server that previously generated the security token, such as in response to a request for token issuance in relation to the server application. The authentication server may have generated the security token by encoding identifier information of the client, where that encoded client identifier information can be used to determine, by the application server, that the security token is valid when a request including the security token is sent to the application server.

At 330, a signature of the security token is validated at the application server. The signature of the security token is validated based on the acquired public key of the authentication server. By validating the signature of the security token, a determination can be made whether the security token is validly issued by the authentication server.

At 340, in response to receiving the request, an identifier associated with the client is determined. The identifier may be determined as part of the received security token, or the identifier can be identified as part of client authentication data received with the request for the resource, and determined to be associated with the client.

In some instances, the determined identifier may be a client key generated by the client. The identifier, such as the client key, may be provided by the client to the authentication server when the client's security token was generated. In some instances, the identifier may be generated by the client, for example, a unique key for identifying the client application can be generated. The generated identifier can be stored at a storage component, such as the security storage component 215 of FIG. 2. In some instances, the received request may include information associated with a location of the client key, so that based on the location information, the application server can retrieve the identifier from the appropriate location.

In some instances, the client generates a security token for authenticating with the application server. The client can request generation of the security token by an authentication server, such as the authentication server 210 of FIG. 2. In some instances, the client can provide the identifier, such as the client key, to the authentication server, where the client key can be incorporated into the identifier in the security token during generation. The security token can be generated to include a message authentication code that is computed using the identifier.

In some instances, the request sent by the client for the resource at the application may include credentials of the client application for authenticating and the security token. The security token can include a message authentication code computed by the authentication server at the time the security token is generated. Such an authentication code can be verified by the application based on the invoked client key from the security storage component.

In some instances, the determined identifier can be a version value that is provided by the client and included in the security token at a versioning field part of the security token. The authentication server may store version values for correspondingly issued security tokens that are valid. When a security token is evaluated to determine its validity, the application server may compare the version value determined as part of the received security token with stored values (e.g., those stored at the authentication server) to determine whether the token is valid. In other instances, the identifier, such as a client key or a version value, can be stored at a separate storage or application and may be invoked by the application server and/or authentication server to support the validation of the security token. It is appreciated that other identifiers that can uniquely identify the client application and that can be encoded as part of the security token may be utilized for the security token generation and used for the subsequent validation.

In some instances, determining the identifier associated with the client comprises retrieving the identifier from a security storage component. The identifier can be a client key generated in advance by the client and stored at the security storage component. For example, the security storage component in some instances can be such as the security storage component 215 of FIG. 2. The security storage component can store the identifier that comprises a client key for the client. When a security token is generated for the client by an authentication server, the identifier can be provided by the client and the client key can be incorporated in the security token during generation at the authentication server. Thus, when the client wants to authenticate itself to an application server, the client can provide the security token, and the security token can be validated based on identity verification according to a public key of authentication server and also based on the client key incorporated in the security token. For example, if the client key that is incorporated in the security token is persisted in the security storage component, then the application server can consider the security token as validly issued. The client key can be retrieved by the application server from the security storage component to validate the security token. In some instances, the security storage component can be external to the authentication server or within the authentication server, or otherwise incorporated in the authentication server or the client.

At 350, the security token is validated based on the identifier associated with the client to determine whether to serve the received request and provide the requested resource. In some instances, in response to determining that the security token is valid, the resource requested by the client is provided by the application.

In some instances, a security token that has been issued by an authentication server in relation to a client application and an application may be required to be invalidated prior to a request for a particular resource. For example, if the security token is breached or leaked to an unauthorized party, if the token is associated with a non-authorized client or user, if the token is not renewed, the security token may be considered invalid. When a request is sent including a security token that is invalidated, that request should be rejected as validation should fail. In some instances, when an already issued security token has to be invalidated, then an identifier, such as the client key, that is included in the issued security token may be regenerated. When the identifier of the client is regenerated, then a new identifier for the client is created and the previous identifier is deleted from the storage (e.g., from the security storage component). If an identifier that is associated with an issued security token is regenerated, then when the security token is analyzed (e.g., when the application server attempts to validate the security token in response to a request from the client), the application server will not be able to validate the identifier as the identifier of the received security token will not be referenced in the storage. In such instances, the request would be rejected and validation will fail.

In some instances, the client identifier can be revoked, and thus, an issued security token that encodes the client identifier is also revoked. The client identifier can be revoked by removing the client identifier from the security storage component. Therefore, when a client identifier part of a security token is validated, the client identifier cannot be determined at the security storage components and the validation of the security token will fail. In such instances, the security token can be determined as invalid based on determining that the identifier associated with the client is not valid.

Figure 4:
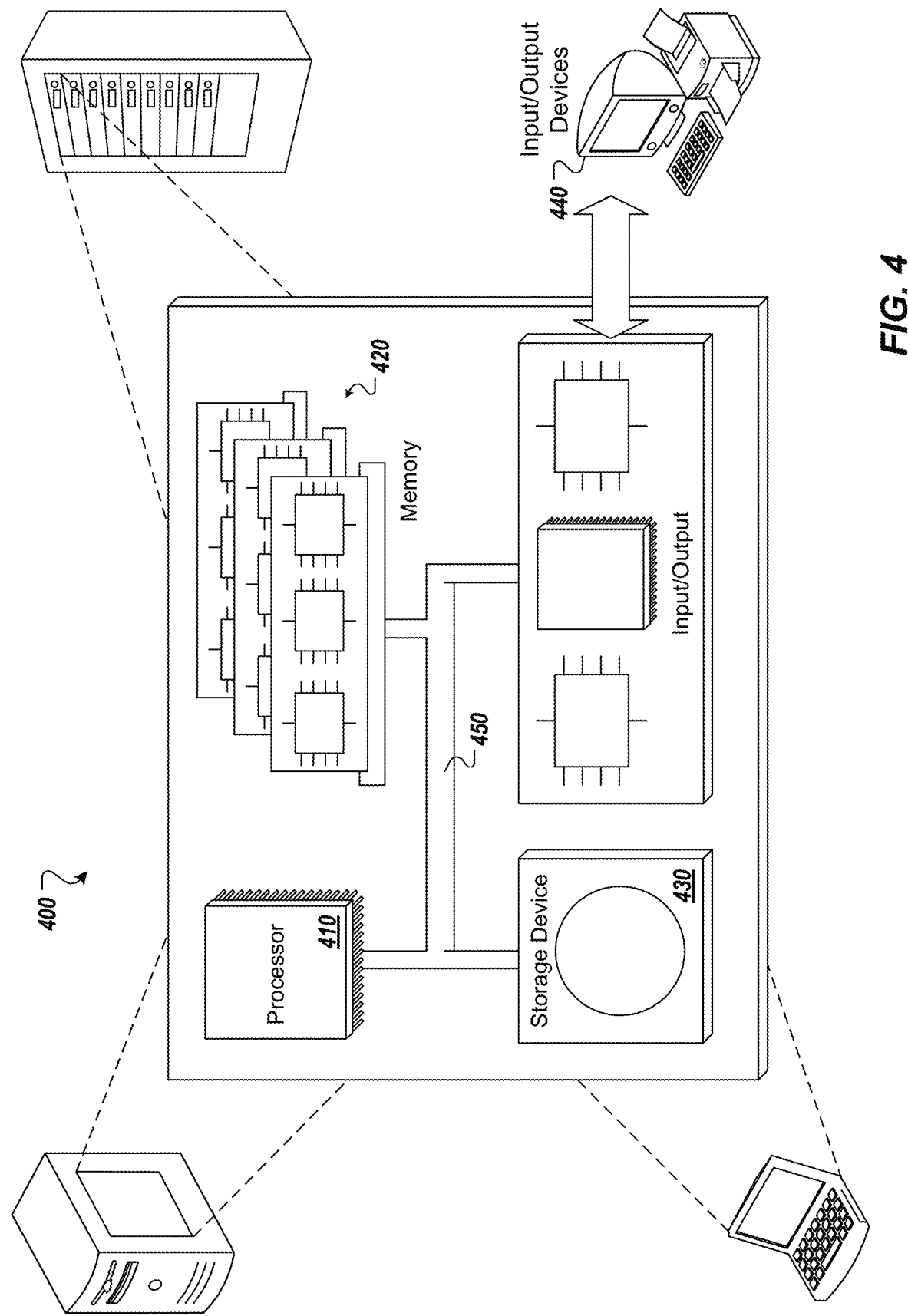
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system, including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising: receiving, at an application server and from a client, a request for a resource, wherein the request is associated with a security token for authenticating the client by the application server; acquiring, at the application server, a public key of an authentication server associated with authenticating requests at the application server; validating, at the application server, a signature of the security token associated with the request for the resource, wherein validating the signature of the security token is based on the acquired public key of the authentication server, wherein validating the signature of the security token determines whether the security token is validly issued by the authentication server; in response to the received request, determining, at the application server, an identifier associated with the client; and validating, at the application server, the security token based on the identifier associated with the client to determine whether to serve the received request and provide the resource.

Example 2. The computer-implemented method of Example 1, further comprising, in response to determining that the security token is valid, providing the requested resource to the client by the application.

Example 3. The computer-implemented method of Example 1 or 2, wherein the determined identifier is a client key generated by the client and provided by the client to the authentication server for generating the security token.

Example 4: The computer-implemented method of any one of Examples 1, 2, or 3, wherein the determined identifier is a version value provided at a versioning field part of the received security token, and wherein the application server compares the determined version value with the stored values to determine whether the token is valid.

Example 5: The method of any one of Examples 1, 2, 3, or 4, wherein determining the identifier associated with the client comprises retrieving the identifier from a security storage component based on information about a location of the identifier included in the security token, wherein the identifier comprises a client key incorporated in the security token during generation at the authentication server.

Example 6: The method of any one of Examples 1 to 5, wherein the identifier is a client key generated in advance by the client and stored at a security storage component, wherein the client key is retrieved by the application server from the security storage component to validate the security token, wherein the security storage component is either external to the authentication server or within the authentication server.

Example 7: The method of any one of Examples 1 to 6, wherein the identifier is received as part of client authentication data received with the request for the resource.

Example 8: The method of any one of Examples 1 to 7, wherein the security token is generated at the authentication server in response to a request sent by the client to the authentication server, wherein during the generation the received request is validated at the authentication server, the client key is collected from a security storage component, a message authentication code of a payload portion of the security token is computed based on the client key, wherein the generated security token is signed with a public key of the authentication server, and wherein the security token includes the computed message authentication code as part of a header part of the security token.

Example 9: The method of any one of Examples 1 to 8, further comprising: generating, at the client, a client key as an identifier for the client; storing, at a security storage component, the generated client key; and generating the security token, at the authentication server, wherein the security token is generated to include a message authentication code that is computed using the client key.

Example 10: The method of any one of Examples 1 to 9, wherein the received request for the resource at the application comprises a security token, wherein the security token is issued by the authentication server for the client, and wherein the request includes credentials of the client for the application server.

Example 11: The method of any one of Examples 1 to 10, wherein the request includes information associated with a location of the client key to be retrieved by the application server.

Example 12: The method of any one of Examples 1 to 11, further comprising: in response to a request to revoke security tokens associated with the client and the identifier, regenerating the identifier of the client to a new identifier comprising deleting the identifier, wherein regenerating the identifier invalidates one or more security tokens issued based on the identifier; and when a request for a resource is received at the application server, wherein the request includes a security token that is determined to be invalid as including a security token comprising an identifier that is invalidated, rejecting the request to provide the resource from the application server to the client.

Similar operations and processes as describes in Examples 1 to 12 may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 12 may also be contemplated.

What is claimed is:

1. A computer implemented method comprising:
   in response to a received request to revoke security tokens generated for a client, regenerating an old identifier of the client to a new identifier, wherein regenerating the old identifier invalidates one or more security tokens issued based on the old identifier;
   receiving, at an application server and from the client, a request for a resource, wherein the request comprises a security token for authenticating the client by the application server, wherein the security token includes the old identifier; and
   in response to validating the security token based on the new identifier generated for the client, rejecting to the received request to provide the resource from the application server to the client.

2. The method of claim 1, wherein the method comprises:
   validating the security token based on the new identifier that is regenerated for the client, wherein validating comprises:
     acquiring, at the application server, a public key of an authentication server usable for authenticating requests at the application server;
     validating, at the application server, a signature of the security token, wherein validating the signature of the security token is based on the acquired public key of the authentication server, and wherein validating the signature of the security token determines whether the security token is validly issued by the authentication server;
     determining, at the application server, the new identifier generated for the client as a currently valid identifier for the client; and
     validating, at the application server, the security token based on the new identifier to determine whether to serve the received request and provide the resource for requests including security tokens including the new identifier as regenerated.

3. The method of claim 1, wherein the new identifier is a client key generated by the client and provided by the client to an authentication server for generating the security token.

4. The method of claim 1, wherein the new identifier is a version value, wherein the request for the resource provides the new identifier at a versioning field part of the security token, and wherein the application server compares the version value with stored values for the client to determine whether the token is valid.

5. The method of claim 1, wherein the new identifier comprises a client key incorporated in the security token during regeneration at an authentication server.

6. The method of claim 5, wherein the new identifier comprises a client key generated in advance by the client and stored at a security storage component, wherein the client key is retrieved by the application server from the security storage component to validate the security token, and wherein the security storage component is either external to the authentication server or internal the authentication server.

7. The method of claim 1, wherein validating the security token comprises retrieving the new identifier by the application server from a security storage component based on information about a location of the new identifier included in the security token.

8. The method of claim 1, wherein the security token is generated at an authentication server in response to a token generation request sent by the client to the authentication server, and wherein, during the generation of the security token, the token generation request is validated at the authentication server.

9. The method of claim 1, wherein a message authentication code of a payload portion of the security token is computed based on the new identifier that is regenerated, and wherein the security token is signed with a public key of an authentication server, and wherein the security token includes the computed message authentication code as part of a header part of the security token.

10. The method of claim 1, wherein the security token is issued by an authentication server for the client, and wherein the request includes credentials of the client for the application server.

11. The method of claim 1, wherein the request includes information for a location of the new identifier to be retrieved by the application server.

12. A non-transitory, computer-readable medium coupled to one or more processors and having instructions stored thereon which, when executed by the one or more processors, cause the one or more processors to perform operations, the operations comprising:
    in response to a request to revoke security tokens generated for a client, regenerating an old identifier of the client to a new identifier, wherein regenerating the old identifier invalidates one or more security tokens issued based on the old identifier;
    receiving, at an application server and from the client, a request for a resource, wherein the request comprises a security token for authenticating the client by the application server, wherein the security token includes the old identifier; and
    in response to validating the security token based on the new identifier regenerated for the client, rejecting the request to provide the resource from the application server to the client.

13. The computer-readable medium of claim 12, further storing instructions, which when executed by the one or more processors, cause the one or more processors to perform operations comprising:
    validating the security token based on the new identifier that is regenerated for the client, wherein validating comprises:
      acquiring, at the application server, a public key of an authentication server usable for authenticating requests at the application server;
      validating, at the application server, a signature of the security token, wherein validating the signature of the security token is based on the acquired public key of the authentication server, and wherein validating the signature of the security token determines whether the security token is validly issued by the authentication server;

determining, at the application server, the new identifier generated for the client as a currently valid identifier for the client; and validating, at the application server, the security token based on the new identifier to determine whether to serve the received request and provide the resource for requests including security tokens including the new identifier as regenerated.

14. The computer-readable medium of claim 12, wherein the new identifier is a client key generated by the client and provided by the client to an authentication server for generating the security token.

15. The computer-readable medium of claim 12, wherein the new identifier is a version value, wherein the request for the resource provides the new identifier at a versioning field part of the security token, and wherein the application server compares the version value with stored values for the client to determine whether the token is valid.

16. A system comprising:
a computing device; and
a computer-readable storage device coupled to the computing device and having instructions stored thereon which, when executed by the computing device, cause the computing device to perform operations, the operations comprising:
in response to a request to revoke security tokens generated for a client, regenerating an old identifier of the client to a new identifier, wherein regenerating the old identifier invalidates one or more security tokens issued based on the old identifier;
receiving, at an application server and from the client, a request for a resource, wherein the request comprises a security token for authenticating the client by the application server, wherein the security token includes the old identifier; and
in response to validating the security token based on the new identifier regenerated for the client, rejecting the request to provide the resource from the application server to the client.

17. The system of claim 16, wherein the computer-readable storage device further stores instructions, which when executed by the computing device, cause the computing device to perform operations comprising:
validating the security token based on the new identifier that is regenerated for the client, wherein validating comprises:
acquiring, at the application server, a public key of an authentication server usable for authenticating requests at the application server;
validating, at the application server, a signature of the security token, wherein validating the signature of the security token is based on the acquired public key of the authentication server, and wherein validating the signature of the security token determines whether the security token is validly issued by the authentication server;
determining, at the application server, the new identifier generated for the client as a currently valid identifier for the client; and
validating, at the application server, the security token based on the new identifier to determine whether to serve the received request and provide the resource for requests including security tokens including the new identifier as regenerated.

18. The system of claim 16, wherein the new identifier is a client key generated by the client and provided by the client to an authentication server for generating the security token.

19. The system of claim 16, wherein the new identifier is a version value, wherein the request for the resource provides the new identifier at a versioning field part of the security token, and wherein the application server compares the version value with stored values for the client to determine whether the token is valid.

20. The system of claim 16, wherein the new identifier comprises a client key incorporated in the security token during regeneration at an authentication server.

* * * * *